Figure 2:
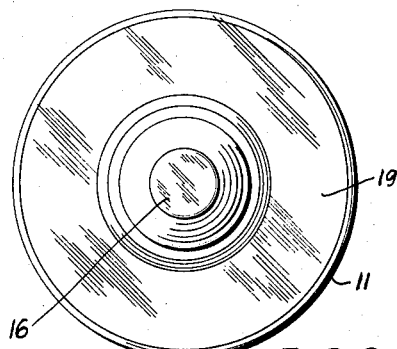

July 15, 1958     J. H. HUBERT ET AL     2,843,101

ADAPTER TYPE ONE-WAY CLUTCH DRIVE MEANS

Filed Jan. 20, 1955

INVENTORS
JAMES H. HUBERT
PAUL A. POUTRE

BY

ATTORNEY.

United States Patent Office 2,843,101
Patented July 15, 1958

2,843,101
ADAPTER TYPE ONE-WAY CLUTCH DRIVE MEANS

James H. Hubert and Paul A. Poutre, Glens Falls, N. Y.

Application January 20, 1955, Serial No. 482,977

1 Claim. (Cl. 123—179)

This invention relates in general to coupling tools, and in particular to automatically disengaging couplings, such as used for starting small engines.

It is known in the field of service and repair of small engines, such as outboard motors, lawn-mower motors and similar small gasoline engines, that the mechanic must pull and keeps pulling on the starter cord, when adjustments are to be made, in order to find out what the trouble is. Furthermore, after having found and corrected the trouble, he must adjust the mechanism of the engine while turning over the crankshaft. This is a most time-consuming job and annoyance.

On the other hand, it is possible to turn over these small engines by attaching an electric motor to it to do the spinning or using other known power means, provided there is an automatic uncoupling device between the driving means and driven crankshaft which permits both parts to turn independently of one another when the gasoline engine starts firing, and which protects both the operator and the power driven tool from being damaged.

It is the principal object of the invention to provide an automatically practical, efficient, economical and safe disengaging coupling tool for starting small engines particularly in service and repair shops.

Another object of the present invention is to provide a coupling tool which can be used in connection with a conventional electric hand drill serving as a starting device for small engines.

A further object of the present invention is to provide a coupling tool which can easily be adapted to various sizes of nuts or shaft ends of the flywheels or crankshafts of small engines.

Another object of the present invention is to provide a tool which is light enough to be held in a handtool.

Yet another object of the present invention is to provide a coupling tool which permits the two motors, namely, the driving and driven motors to turn independently of one another as soon as the engine to be started begins to fire and to run at a speed different from that of the starting device.

A further object of the present invention is to provide a mechanism which is of sturdy and compact design.

Another object of the invention is to provide a device which is simple, and is easily and safely operated.

Yet another object of the present invention is to provide an article of manufacture which can be produced economically and inexpensively.

Various further and more specific objects, features and advantages will clearly appear from the detailed description given below taken in connection with the accompanying drawings which form part of this specification and illustrate merely by way of example certain embodiments of the device of the invention.

The invention consists in the novel features, arrangements and combinations of parts as may be shown and described in connection with the device herein disclosed by way of example only and as illustrative of certain preferred embodiments.

In the following description and in the claims, parts will be identified by specific names for convenience, but such names are intended to be as generic in their application to similar parts as the art will permit. Like references and characters denote like parts in the several figures of the drawing.

Figure 4:
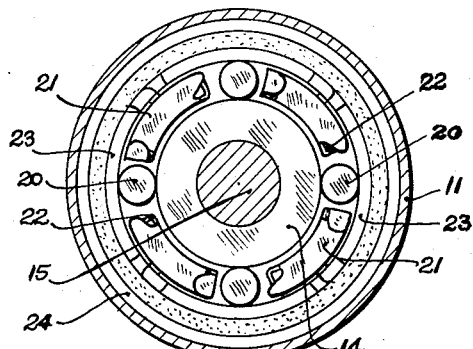
Figure 1:
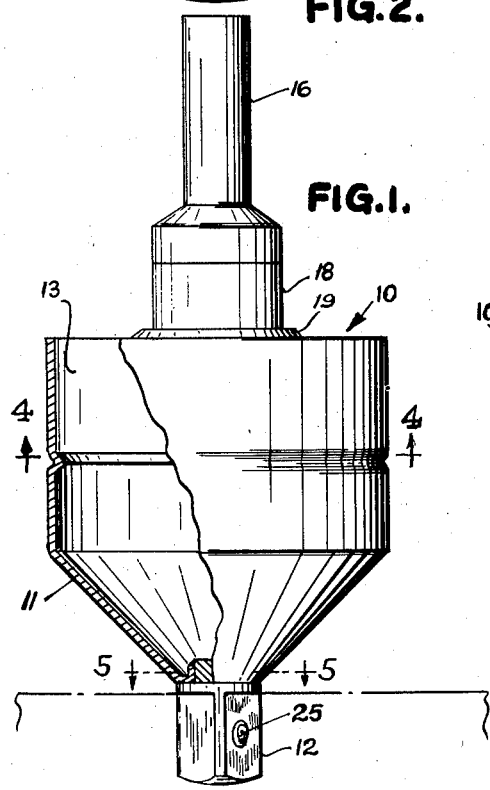
Figure 6:
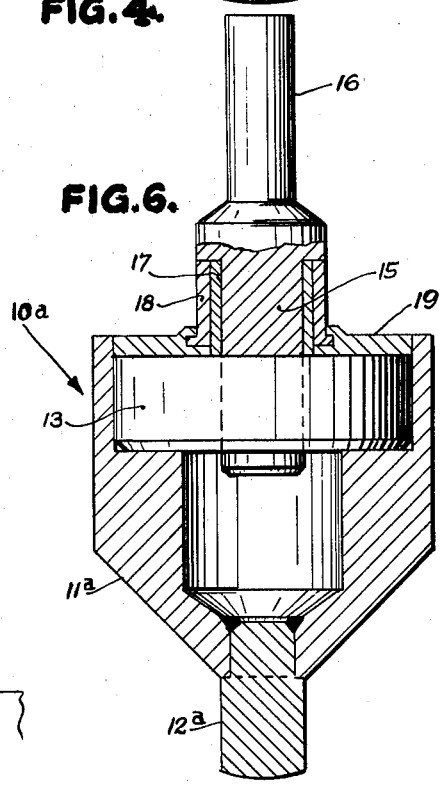
Figure 3:
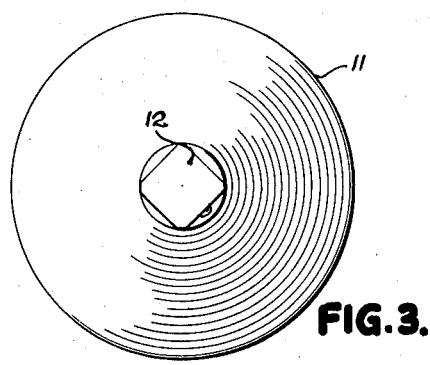
Figure 5:
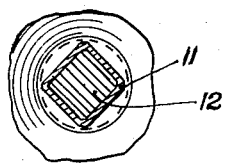

Referring now to the drawing:
Fig. 1 is a view of the coupling tool, partly broken away, according to the invention;
Fig. 2 is a top view of the coupling tool;
Fig. 3 is a bottom view of the device;
Fig. 4 is a cross section along the line 4—4 of Fig. 1;
Fig. 5 is a cross section along the line 5—5 of Fig. 1;
Fig. 6 is a partly sectional view of the device, showing another version of the body of the tool.

Referring now more particularly to the drawing illustrating preferred examples of carrying out the invention, there is disclosed in Figs. 1 to 5 a coupling tool generally indicated by the numeral 10, comprising a retaining body 11, made of pressed sheet metal. The body 11 comprises a male socket receiver 12, firmly connected to the lower end of it either by pressing in or by welding, having a conventional spring loaded detent ball 25 to hold a socket wrench or the like, and an overrunning clutch 13 inserted into the upper end of the body 11.

The overrunning clutch 13 consists of an inner ring 14, a plurality of clutch rollers 20, interspaced spring housing members 21, compression springs 22 retained in said housing members 21 and torque transmitting shoes 23 held in place by the outer ring 24 of the clutch. A shaft 15 (Fig. 4) is connected to the inner ring 14 of the clutch 13, the extension 16 (Fig. 1) of which fits into the chucking device of a conventional electric hand drill (not shown in the drawing). A sleeve 18, firmly kept in a cover plate 19, comprises a bushing (not shown in Fig. 1) to keep the rotating shaft 15 in place. The cover plate 19 is solidly inserted into the body 11, thus keeping the internal parts of the coupling tool together and closing the device to prevent dust or dirt from entering into it.

The embodiment illustrated in Fig. 6 is designated generally by the numeral 10a. It includes a solid steel body 11a having a male socket receiver 12a welded or otherwise secured to its lower end. These parts correspond generally to the body 11 and receiver 12 of the embodiment of Figs. 1 to 5.

In all other respects the tool 10a of Fig. 6 may be identical to the tool 10 of Figs. 1 to 5, and this fact has been indicated by the use of identical reference numerals for the clutch 13, the shaft 15, the shaft extension 16, the cover plate 19, and the sleeve 18. Fig. 6 also illustrates a bushing 17 disposed within the sleeve 18 in contact with the rotating shaft 15, and it will be understood that the bushing referred to above in the description of the embodiment of Figs. 1 to 5 may be identical to the bushing 17.

From the foregoing it is quite evident that there herein has been described a tool which is well adapted as a repair shop necessity for starting particularly stubborn small engines. It may be used in any conventional electric drill, of one-half inch size or so, and which is adjustable to the various size nuts on the flywheels by merely changing the socket. By using the overrunning clutch the engine, when started, will not throw the drill out of the operator's hand. The coupling tool has been devised for attachment to a small electric hand drill which will impart the power of the drill to the small gasoline or other motor or engine, yet would have a slipping mechanism to permit each motor to turn independent of the other once the gasoline engine starts.

While the invention has been described with respect to certain particular preferred examples which give satisfactory results, it will be understood by those skilled in the art after understanding the invention, that various changes and modifications may be made without departing from the spirit and scope of the invention and it is intended, therefore, in the appended claim to cover all such changes and modifications.

What we claim is:

A coupling tool for detachably connecting a driving means to the crankshaft of an engine so as to facilitate the starting of the engine, comprising a cylindrical body tapered at the one end, a socket receiver rigid therewith projecting from said tapered end of said body for detachably connecting said tool to the crankshaft of an engine, a drive shaft rotatably mounted in said body and protruding from the other end of said body for detachable connection to a driving means, and an overrunning clutch disposed within said body and connecting said body thereto to turn with said shaft, said tool being a unitary structure independent of and normally disconnected from said crankshaft.

References Cited in the file of this patent
UNITED STATES PATENTS

| | | |
|---|---|---|
| 75,091 | Weston | Mar. 3, 1868 |
| 1,779,519 | Tremlett | Oct. 28, 1930 |
| 2,153,938 | Padgett | Apr. 11, 1939 |
| 2,203,805 | Wiggs | June 11, 1940 |
| 2,322,608 | Webster | June 22, 1943 |
| 2,475,750 | McCormick et al. | July 12, 1949 |
| 2,517,910 | Miller | Aug. 8, 1950 |
| 2,565,579 | Thorner | Aug. 28, 1951 |
| 2,712,254 | Schodeberg | July 5, 1955 |